US007194612B2

United States Patent
Rothman et al.

(10) Patent No.: US 7,194,612 B2
(45) Date of Patent: Mar. 20, 2007

(54) SYSTEM AND METHOD TO EXPORT PRE-BOOT SYSTEM ACCESS DATA TO BE USED DURING OPERATING SYSTEM RUNTIME

(76) Inventors: Michael A. Rothman, 8308 16th Ave. SE., Olympia, WA (US) 98513; Vincent J. Zimmer, 1937 S. 369th St., Federal Way, WA (US) 98003

( * ) Notice: Subject to any disclaimer, the term of this patent is extended or adjusted under 35 U.S.C. 154(b) by 453 days.

(21) Appl. No.: 10/746,576

(22) Filed: Dec. 24, 2003

(65) Prior Publication Data

US 2005/0144433 A1    Jun. 30, 2005

(51) Int. Cl.
G06F 15/177    (2006.01)
(52) U.S. Cl. .......................................... 713/1
(58) Field of Classification Search ............... 713/1
See application file for complete search history.

(56) References Cited

U.S. PATENT DOCUMENTS

| 6,167,511 | A * | 12/2000 | Lewis ............................. 713/2 |
| 6,601,178 | B1 * | 7/2003 | Gulick ....................... 713/322 |
| 6,877,018 | B2 * | 4/2005 | Oshins et al. ............... 707/206 |
| 2003/0041271 | A1 * | 2/2003 | Nalawadi et al. ........... 713/300 |
| 2004/0243534 | A1 * | 12/2004 | Culter et al. .................... 707/1 |
| 2005/0076324 | A1 * | 4/2005 | Lowell et al. .............. 717/100 |
| 2005/0108511 | A1 * | 5/2005 | Zimmer et al. ................ 713/1 |
| 2005/0114687 | A1 * | 5/2005 | Zimmer et al. ............. 713/193 |

OTHER PUBLICATIONS

"Advanced Configuration and Power Interface Specification" Jul. 2000; Compaq, Intel, Microsoft, Phoenix Technologies, Toshiba Corp.; Revision 2.0; pp. 225-231.*

* cited by examiner

Primary Examiner—Chun Cao
(74) Attorney, Agent, or Firm—Joni D. Stutman-Horn

(57) ABSTRACT

A system and method for sharing pre-boot data with agents in the operating system (OS) runtime is disclosed. The disclosed system and method provides a means by which one may be able to provide access to firmware data in the OS runtime without assuming the OS provides non-volatile (NV) variable abstractions. The disclosed system and method leverages Advanced Configuration and Power Interface (ACPI) constructs to achieve the same result for firmware data propagation into the OS runtime. A descriptor table is constructed which describes the location of the system table. The OS application is provided a pointer to the descriptor, which allows it access to firmware (pre-boot) resources.

27 Claims, 3 Drawing Sheets

```
typedef struct {
    ...
    EFI_RUNTIME_SERVICES    *Runtime Services;
    EFI_BOOT_SERVICES       *BootServices;
    UINTN                   *NumberofTableEntries;
    EFI_CONFIGURATION_TABLE *ConfigurationTable;
} EFI_SYSTEM_TABLE
```

Critical Firmware Structure

*Fig. 1*
*(Prior Art)*

SYSTEM AND METHOD TO EXPORT PRE-BOOT SYSTEM ACCESS DATA TO BE USED DURING OPERATING SYSTEM RUNTIME

FIELD OF THE INVENTION

An embodiment of the present invention relates generally to communication of data between pre-boot and operating system runtime modes and, more specifically, to export pre-boot system access data to be used during operating system runtime, where in one embodiment, the system architecture uses an extensible firmware interface (EFI).

BACKGROUND INFORMATION

Various mechanisms exist for accessing pre-boot data in existing systems. However, accessing pre-boot data by an operating system (OS) has been problematic. The ability to access pre-boot data is important, especially with the advent of extensible firmware interface (EFI) architecture systems.

The EFI specification defines a new model for the interface between operating systems and platform firmware. The interface consists of data tables that contain platform-related information, plus boot and runtime service calls that are available to the operating system and its loader. Together, these provide a standard environment for booting an operating system and running pre-boot applications.

The EFI specification is primarily intended for the next generation of IA-32 and Itanium® Architecture-based computers, and is an outgrowth of the "Intel Boot Initiative" (IBI) program that began in 1998 by Intel Corporation. More information about EFI can be found on the World Wide Web, specifically at http://www.intel.com/technology/efi.

A fundamental issue with operating systems and EFI is the ability for OS agents or OS applications to extract information from EFI. When the OS is loading, an OS loader is privy to all information associated with EFI. The OS loader is passed all pertinent information, including system table information, runtime services, boot services, etc., including a configuration table. A problem is that the OS, for example, Microsoft® Windows™, does not provide this information to an external user. So, internal Windows™ applications might have the EFI information available, but any application developer who uses the software development kit or uses a typical driver or application available in the development community does not have the ability to retrieve this information. If a developer wants to pass information from the pre-boot into the OS runtime, they have no means to get the information. If an application advertises information from the firmware through the configuration table, then the OS itself has knowledge of everything upon loading. The OS consumes all information pertinent to its uses and does what it wants with the information. The OS does not export any application program interfaces (APIs) or any means by which to extract the system table (which is actually the EFI's system table), where the table encapsulates the pertinent tables which are constructed within EFI.

BRIEF DESCRIPTION OF THE DRAWINGS

The features and advantages of the present invention will become apparent from the following detailed description of the present invention in which:

FIG. 1 is an excerpt of an exemplary structure definition typically used by an extensible firmware interface (EFI) to define the EFI system table, according to existing systems (prior art);

DETAILED DESCRIPTION

Figure 2:
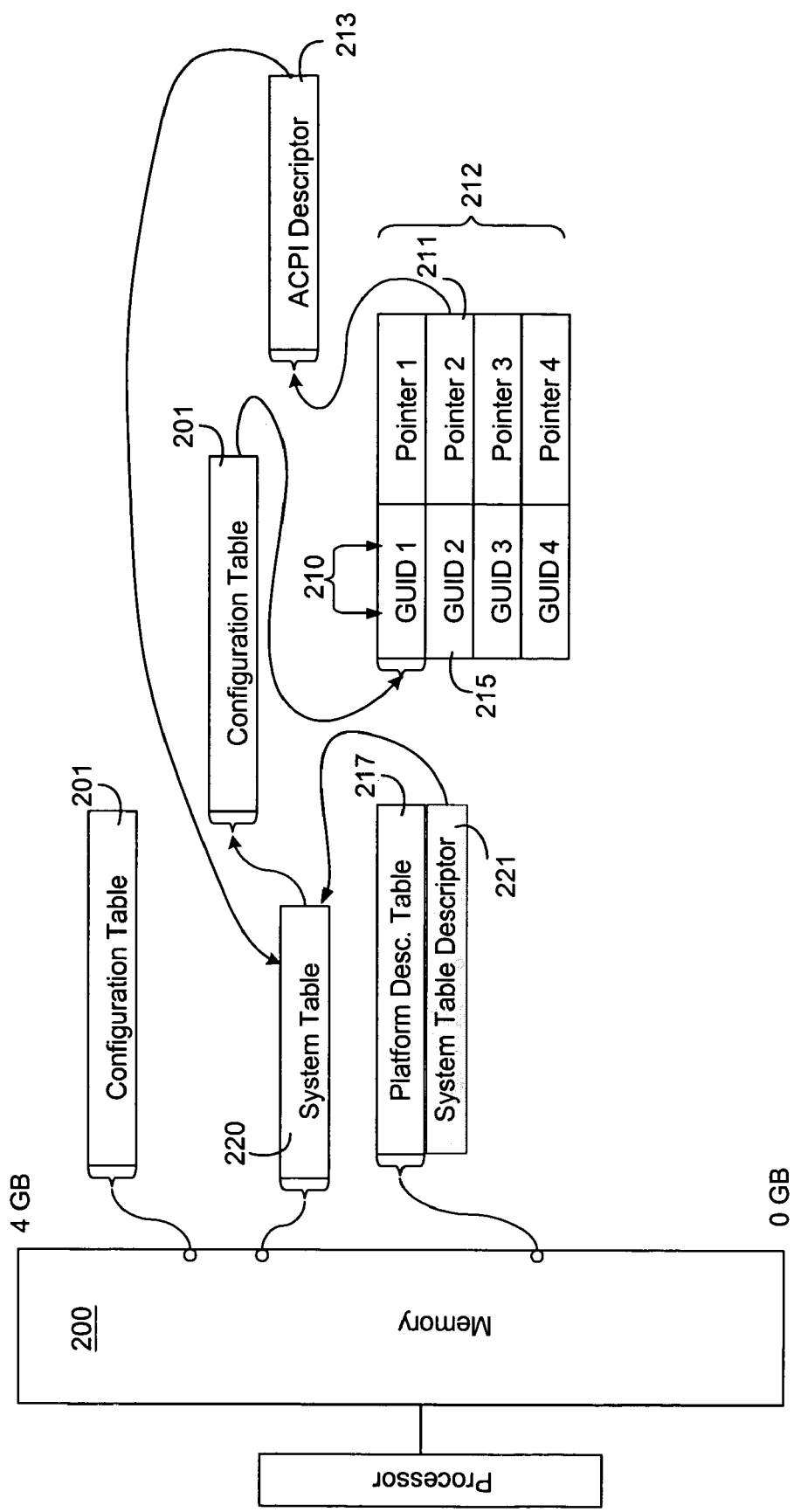
FIG. 2 is a block diagram representation of how globally unique identifier (GUID)-pointer pairs identify regions of memory, according to an embodiment of the disclosed system and method.

The ability to share pre-boot data with agents in the operating system (OS) runtime has heretofore been limited to the OS abstracting non-volatile (NV) variable services, so that they were accessible by OS agents. The disclosed system and method provides a means by which one may be able to provide access to firmware data in the OS runtime without assuming that the OS provides NV variable abstractions. Today, Advanced Configuration and Power Interface (ACPI) compliant operating systems are fairly ubiquitous, and because of this, the disclosed system and method leverages ACPI to achieve the same result for firmware data propagation into the OS runtime.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

FIG. 1 shows an excerpt of an exemplary definition typically used by EFI to define the EFI system table. Only a relevant excerpt is shown. The structure is a series of fields 101, 103, 105 of items that must be described in the system table. These are items that are commonly used by the OS loader, and also items that may be proxied or may be of interest to other system components later on in the OS runtime space.

The EFI Runtime Services item 101 is the means by which to determine certain services that the firmware is providing to the OS, for instance, date and time services. The runtime services may identify a minimal subset of runtime services that are available throughout the lifetime of the computer system, i.e., services that EFI provides to all system components. These services may be masked by application program interfaces (APIs) that the OS provides, thereby allowing the OS control over which applications may have access to the service. This item may be a pointer to another structure. The EFI-runtime_services structure is a series of function pointers, where the function pointers point to the runtime functions themselves.

The EFI_BOOT Services item 103 is transient. This service is similar to the EFI Runtime Services from a syntactical point of view. This item is a pointer to a structure of function pointers. When the OS loader is first initialized, and the system is about to transition from pre-boot to runtime when the system is still in pre-boot, the Boot services are active. When the pre-boot phase is finishing, the OS loader calls an EXIT_BOOT_SERVICES function. Once the EXIT_BOOT_SERVICES function is invoked, the boot services entry is nullified for future use. In other words, this service is available only during boot time.

The UINTN item 105 specifies the number of entries in the configuration table. The EFI_configuration table 107 is a pointer to a set of globally unique identifier (GUID)-pointer pairs. In existing systems, a GUID is typically a 128-bit value and is used to uniquely describe something.

Referring to FIG. 2, there is shown a block diagram representation of how GUID-pointer pairs identify regions of memory 200. An application "walks" the configuration table 201 looking for a well known GUID 210, for instance, the GUID 215 identifies an ACPI descriptor 213. Once found, there is a pointer 211 associated with the GUID 215 that points to a location in memory 220 that contains the system table.

The configuration table 201 is a series of GUID pointer pairs 212. There may be n pairs, where n is any integer, or 0 pairs. The number of pairs is limited by the size of memory in the system.

Any entity that needs to be advertised in the configuration table will have a unique value (GUID) for which to search. The pointer associated with the GUID points to the location where this entity has been loaded. It is invalid to have multiple entries with the same GUID. For a more thorough explanation of GUIDs and their associated pointers, see the EFI specification available at http://www.intel.com/technology/efi/.

The OS does not export any application program interfaces (APIs) or any means by which to extract the system table 220, where the table encapsulates the pertinent tables which are constructed within EFI. Some exemplary items of the system table are shown in FIG. 1, i.e., runtime services 101; boot services 103; number of entries 105; and configuration table 107, are pertinent fields associated with the system table that the OS typically uses.

The means by which to gather system information is a feature of the disclosed system and method. The Advanced Configuration and Power Interface Specification 2.0, which may be found at http://www.acpi.info, defines specific usage models and means by which one describes information. However, it does not necessarily provide a means by which one could pass binary data, for instance, a program, up through a table. ACPI does not provide a means to discover information which is not defined in the ACPI constructs. The disclosed method is a free form means by which to advertise information, by providing a pointer to a description of information. This method effectively circumvents the OS's ability to utilize information which it does not make accessible to other runtime applications. The configuration table 201 has a pointer 211 to an ACPI descriptor 213 which points to the system table 220. Therefore, any OS application that requires system table information may access the system table information by walking the configuration table looking for the appropriate ACPI descriptor.

Since the ACPI specification is a public document, requiring consensus agreement by the industry leaders, it describes only those constructs that are pertinent and agreed for use by an ACPI descriptor. The disclosed method extends the documented functionality of ACPI and EFI for system management.

Figure 3:
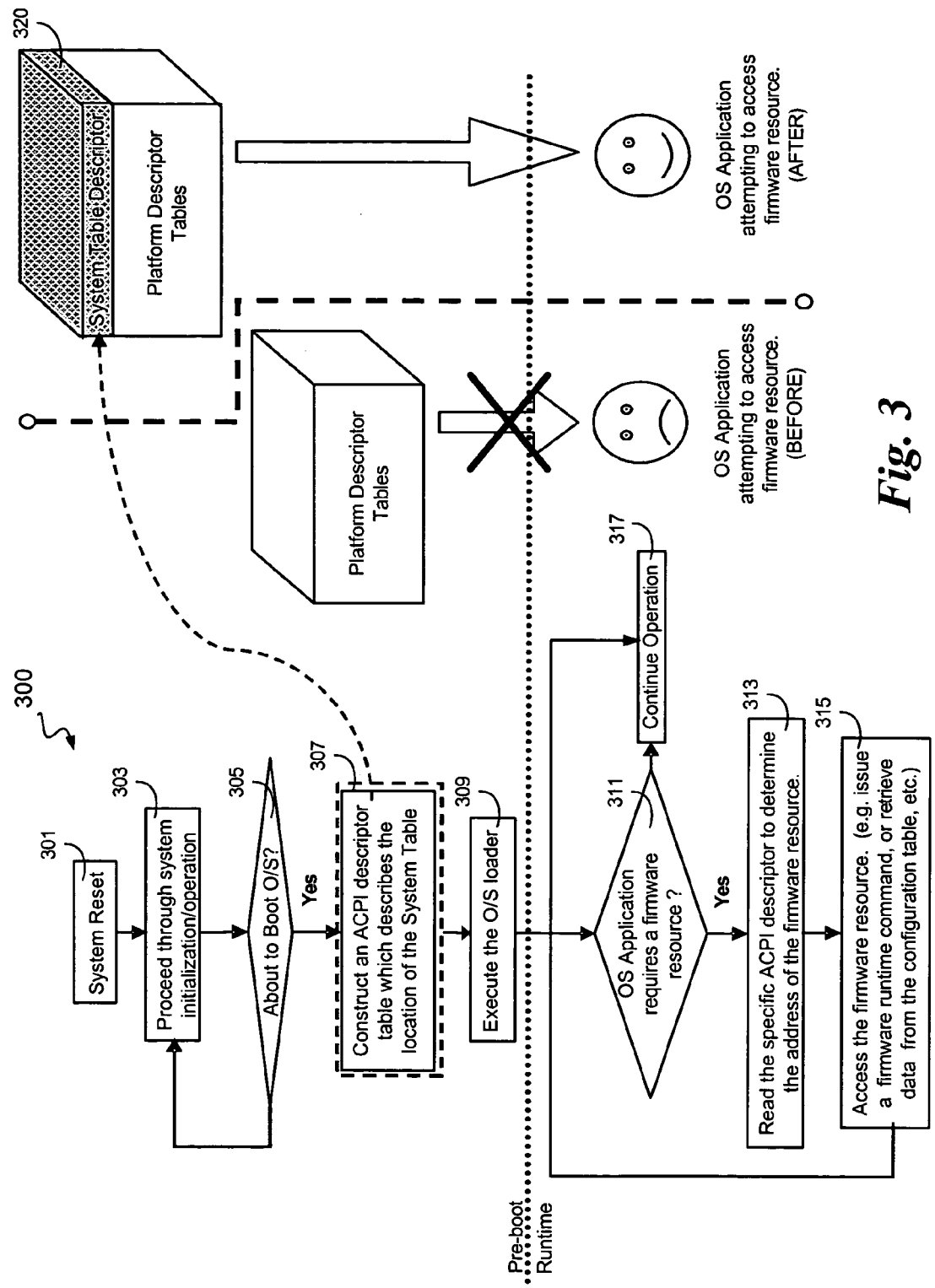
FIG. 3 is a flow diagram showing an exemplary method for accessing system table information, according to an embodiment of the disclosed system.

Referring now to FIG. 3, there is shown an exemplary method 300 for accessing system table information. A computer system is reset in block 301. The system proceeds through system initialization and operation in block 303. At some point during initialization, it will be time to boot the OS. It is determined whether the OS is about to be booted in block 305. If not, then the system proceeds with system initialization in block 303. If so, an ACPI descriptor table is constructed which describes the location of the system table (320) in block 307. In one embodiment, descriptors for firmware resources are stored to a Secondary System Description Table ("SSDT"), as defined by an Advance Configuration and Power Interface ("ACPI") specification, such as the ACPI Specification, Revision 2.0a, Mar. 31, 2002 (ACPI specifications are available at www.acpi.info). The SSDT is a continuation of a Differentiated System Description Table ("DSDT"). The DSDT supplies implementation and configuration information about a base system. A descriptor identifying the location of the system table is stored in the SSDT also. Once the system table descriptor is stored in the SSDT, it is available to a variety of runtime applications. The OS loader is then executed in block 309.

During runtime, it is determined whether an OS application requires a firmware resource, in block 311. If not, OS application operation may continue normally in block 317. If so, a specific ACPI descriptor may be read to determine the address of the firmware resource, in block 313. The OS application may then access the firmware resource in block 315. The OS application may issue a firmware runtime command, or retrieve the data from the configuration table, or use any other authorized method to retrieve the data. Without the construction of the ACPI descriptor table which describes the location of the system table, the firmware resource would not be able to be located by the OS application. Once the firmware resource has been accessed, the OS application continues operation in block 317.

In another embodiment, a legacy system uses a similar method to provide OS application access to firmware resources typically only available during pre-boot. In legacy environments, i.e., non-EFI architectures, instead of a system table, per se, there is another sort of descriptor. Legacy systems use int calls, for example, int13 or int15. The int calls are the construct used to call the Basic Input/Output System (BIOS). Basically, an int call is a software interrupt entry point. When the OS begins to run, these int routines are masked off and not accessible. Direct communication to the OS is not allowed in existing non-EFI systems. Any attempt to do so results in a fault.

Legacy systems suffer from the same problem as described above. Suppose it is desirable to advertise a specific item. The interrupt call that is used would provide information of interest. For example, suppose a system has a firmware device that advertises a "blob" of information. That blob may be callable through an int15 call (this is a common BIOS legacy interface). Int15 calls are often enumerated by the value of A(X), where A(X) is a 16-bit value that is unique to an API. During pre-boot it could be advertised that the blob is available through int15. However, the OS blocks the int15 call. In legacy systems, one may proxy the same information (blob) through a system table. A descriptor, 5000, may be associated with int15 to effect a similar method of pointing to the blob of data. In contrast to the embodiments described above for EFI architecture, instead of having a formal construct like the EFI system table, one may create a more free form construct. In effect, an ACPI descriptor table needed for non-EFI embodiments, not the system table. Thus, in legacy systems, if it is necessary to advertise information that the OS would normally mask, the disclosed method could achieve that by using ACPI descriptors.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, and optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for exporting pre-boot system access data to be used during operating system runtime, comprising:
   constructing a descriptor table during pre-boot, the descriptor table describing a location of a pre-boot system table, wherein the descriptor table is accessible during runtime;
   determining whether a runtime application requires a firmware resource accessible via the pre-boot system table; and
   determining a location for the required firmware resource using a corresponding descriptor in the descriptor table.

2. The method as recited in claim 1, further comprising accessing the required firmware resource.

3. The method as recited in claim 2, wherein accessing the required firmware resource comprises at least one of issuing a firmware runtime command and retrieving data from the descriptor table associated with the pre-boot system table.

4. The method as recited in claim 1, wherein the descriptor table is an advanced configuration and power interface (ACPI) descriptor table.

5. The method as recited in claim 4, wherein the ACPI descriptor table comprises a plurality of globally unique identifier (GUID)-pointer pairs, wherein the GUID identifies an entity and the pointer points to the location of the entity in memory.

6. The method as recited in claim 5, wherein the entity is one of a runtime service, a table and data.

7. The method as recited in claim 1, wherein the pre-boot system table comprises at least one of platform-related information, boot services and runtime services, wherein the runtime services are available to the operating system (OS) and the OS loader.

8. The method as recited in claim 1, wherein the descriptor table is an ACPI construct.

9. The method as recited in claim 8, wherein the descriptor table is compatible with an extensible firmware interface (EFI) architecture.

10. The method as recited in claim 1, wherein the required firmware resource has a corresponding unique identifier in the descriptor table.

11. A machine accessible medium for exporting pre-boot system access data to be used during operating system runtime having instructions that when executed, cause the machine to:
   construct a descriptor table during pre-boot, the descriptor table describing a location of a pre-boot system table, wherein the descriptor table is accessible during runtime;
   determine whether a runtime application requires a firmware resource accessible via the pre-boot system table; and
   determine a location for the required firmware resource using a corresponding descriptor in the descriptor table.

12. The machine accessible medium as recited in claim 11, further having instructions that cause the machine to access the required firmware resource.

13. The machine accessible medium as recited in claim 12, wherein accessing the required firmware resource comprises at least one of issuing a firmware runtime command and retrieving data from the descriptor table associated with the pre-boot system table.

14. The machine accessible medium as recited in claim 11, wherein the descriptor table is an advanced configuration and power interface (ACPI) descriptor table.

15. The machine accessible medium as recited in claim 14, wherein the ACPI descriptor table comprises a plurality of globally unique identifier (GUID)-pointer pairs, wherein the GUIDs identify an entity and the pointer points to the location of the entity in memory.

16. The machine accessible medium as recited in claim 15, wherein the entity is one of a runtime service, a table and data.

17. The machine accessible medium as recited in claim 11, wherein the pre-boot system table comprises platform-related information, boot services and runtime services, wherein the runtime services are available to the operating system (OS) and the OS loader.

18. The machine accessible medium as recited in claim 11, wherein the descriptor table is an ACPI construct.

19. The machine accessible medium as recited in claim 18, wherein the descriptor table is compatible with an extensible firmware interface (EEI) architecture.

20. The machine accessible medium as recited in claim 11, wherein the required firmware resource has a corresponding unique identifier in the descriptor table.

21. A system for exporting pre-boot system access data to be used during operating system runtime, comprising:
 a processor having memory;
 a descriptor table in memory, the descriptor table comprising a plurality of unique identifier and pointer pairs, wherein for each pair, the unique identifier identifies an entity and the corresponding pointer points to the location of the entity in memory, and wherein the descriptor table is capable of identifying a pre-boot system table where the descriptor table is capable of being accessed during runtime, thereby providing runtime application access to the pre-boot system table and a desired firmware resource.

22. The system as recited in claim 21, wherein the descriptor table is an advanced configuration and power interface (ACPI) descriptor table.

23. The system as recited in claim 21, wherein the entity is one of a runtime service, a table and data.

24. The system as recited in claim 21, wherein the pre-boot system table comprises at least one of platform-related information, boot services and runtime services, wherein the runtime services are available to the operating system (OS) and the OS loader.

25. The system as recited in claim 21, wherein the descriptor table is an advanced configuration and power interface (ACPI) construct.

26. The system, as recited in claim 25, wherein the descriptor table is compatible with an extensible firmware interface (EFI) architecture.

27. The system as recited in claim 21, wherein the firmware resource desired during runtime has a corresponding unique identifier in the descriptor table.

* * * * *